(12) United States Patent
Gruber et al.

(10) Patent No.: US 11,649,852 B2
(45) Date of Patent: May 16, 2023

(54) BALL JOINT WITH INJECTION MOLDED BEARING

(71) Applicant: Multimatic Inc., Markham (CA)

(72) Inventors: Rudolf Gruber, Uxbridge (CA); Thomas Alexander Sparrow, Toronto (CA); Ryan Warren Alexander, Etobicoke (CA)

(73) Assignee: MULTIMATIC INC., Markham (CA)

( * ) Notice: Subject to any disclaimer, the term of this patent is extended or adjusted under 35 U.S.C. 154(b) by 0 days.

(21) Appl. No.: 17/981,918

(22) Filed: Nov. 7, 2022

(65) Prior Publication Data

US 2023/0066072 A1    Mar. 2, 2023

Related U.S. Application Data

(62) Division of application No. 16/638,843, filed as application No. PCT/CA2018/050999 on Aug. 16, 2017, now Pat. No. 11,608,854.

(60) Provisional application No. 62/681,990, filed on Jun. 7, 2018, provisional application No. 62/546,091, filed on Aug. 16, 2017.

(51) Int. Cl.
*F16C 11/06* (2006.01)
*F16C 33/10* (2006.01)

(52) U.S. Cl.
CPC ...... *F16C 11/0623* (2013.01); *F16C 11/0685* (2013.01); *F16C 33/102* (2013.01)

(58) Field of Classification Search
CPC .............. F16C 11/0628; F16C 11/0633; F16C 11/0657; F16C 11/0623; F16C 11/068; F16C 11/0685; F16C 33/102
See application file for complete search history.

(56) References Cited

U.S. PATENT DOCUMENTS

| | | |
|---|---|---|
| 1,520,862 A | 12/1924 | Faudi |
| 2,181,300 A | 11/1939 | Flumerfelt |
| 2,271,293 A | 1/1942 | Flumerfelt |
| 2,933,336 A | 4/1960 | Pritchard et al. |
| 2,977,131 A | 3/1961 | Moskovitz et al. |
| 2,993,717 A | 7/1961 | Gottschald |
| 3,063,744 A | 11/1962 | Flumerfelt |

(Continued)

FOREIGN PATENT DOCUMENTS

| | | |
|---|---|---|
| DE | 19638252 A1 | 3/1998 |
| DE | 19921553 A1 | 11/2000 |

(Continued)

OTHER PUBLICATIONS

International Search Report and Written Opinion for International Application No. PCT/CA2018/050999 dated Nov. 8, 2018.

(Continued)

*Primary Examiner* — Daniel J Wiley
(74) *Attorney, Agent, or Firm* — Carlson, Gaskey & Olds, P.C.

(57) ABSTRACT

A method of manufacturing a ball joint includes arranging a ball in a bore of a housing, and enclosing an end of the bore. Plastic is injected into a space between the housing and the ball to form a bearing that has a bearing surface that engages the ball. The bearing shrinks to form a recess in the bearing surface so that the recess can be filled with a grease.

15 Claims, 14 Drawing Sheets

(56) References Cited

U.S. PATENT DOCUMENTS

| | | | |
|---|---|---|---|
| 3,322,445 A | 5/1967 | Hassan |
| 3,350,121 A | 10/1967 | Townsend |
| 3,530,495 A | 9/1970 | Kindel |
| 3,539,210 A | 11/1970 | Wehner et al. |
| 3,555,662 A | 1/1971 | Powell |
| 3,574,370 A | 4/1971 | Andrew |
| 3,613,201 A | 10/1971 | Herbenar |
| 3,679,248 A | 7/1972 | Herbenar |
| 3,802,789 A | 4/1974 | Patton et al. |
| 3,833,309 A | 9/1974 | Hobbs |
| 3,843,272 A | 10/1974 | Jorn |
| 3,846,032 A | 11/1974 | Harada et al. |
| 3,901,518 A | 8/1975 | Uchida |
| 3,945,737 A | 3/1976 | Herbenar |
| 3,953,139 A | 4/1976 | Uchida |
| 3,969,030 A | 7/1976 | Sullivan |
| 3,999,870 A | 12/1976 | Clark et al. |
| 4,016,950 A | 4/1977 | Allison |
| 4,121,844 A | 10/1978 | Nemoto et al. |
| 4,230,415 A | 10/1980 | Scheerer |
| 4,283,833 A | 8/1981 | Pyles |
| 4,318,627 A | 3/1982 | Morin |
| 4,527,924 A | 7/1985 | Asberg |
| 4,538,935 A | 9/1985 | Burmeister et al. |
| 4,571,110 A | 2/1986 | Amrath |
| 4,639,160 A | 1/1987 | Huesman |
| 4,650,362 A | 3/1987 | Kubo |
| 4,684,279 A | 8/1987 | Weber |
| 4,695,181 A | 9/1987 | Rahmede et al. |
| 4,695,182 A | 9/1987 | Wood, Jr. |
| 4,712,940 A | 12/1987 | Wood, Jr. |
| 4,720,205 A | 1/1988 | Ito |
| 4,750,885 A | 6/1988 | Ito |
| 4,790,682 A | 12/1988 | Henkel |
| 4,846,590 A | 7/1989 | Teramachi |
| 4,903,386 A | 2/1990 | Teramachi |
| 4,916,788 A | 4/1990 | Mitoya |
| 4,921,368 A | 5/1990 | Busse et al. |
| 4,974,985 A | 12/1990 | Glatzel |
| 4,979,844 A | 12/1990 | Teramachi |
| 5,011,320 A | 4/1991 | Love et al. |
| 5,066,159 A | 11/1991 | Urbach |
| 5,070,609 A | 12/1991 | Teramachi |
| 5,078,531 A | 1/1992 | Sakai et al. |
| 5,152,628 A | 10/1992 | Broszat et al. |
| 5,154,530 A | 10/1992 | Dresselhouse |
| 5,163,769 A | 11/1992 | Dresselhouse |
| 5,163,772 A | 11/1992 | Wood |
| 5,186,440 A | 2/1993 | Schobbe et al. |
| 5,188,476 A | 2/1993 | Mori |
| 5,286,131 A | 2/1994 | Wood |
| 5,342,128 A | 8/1994 | Gruber |
| 5,364,191 A | 11/1994 | Gruber |
| 5,380,114 A | 1/1995 | Urbach |
| 5,464,296 A | 11/1995 | Broszat |
| 5,492,427 A | 2/1996 | Ersoy et al. |
| 5,509,749 A | 4/1996 | Eifert et al. |
| 5,678,947 A | 10/1997 | Urbach et al. |
| 5,697,723 A | 12/1997 | Wood |
| 5,752,780 A | 5/1998 | Dorr |
| 5,782,573 A | 7/1998 | Dorr et al. |
| 5,782,574 A | 7/1998 | Henkel |
| 5,813,789 A | 9/1998 | Prickler et al. |
| 5,885,022 A | 3/1999 | Maughan et al. |
| 5,927,891 A | 7/1999 | Trumbower et al. |
| 5,997,208 A | 12/1999 | Urbach et al. |
| 6,007,079 A | 12/1999 | Kincaid et al. |
| 6,010,272 A | 1/2000 | Littman |
| 6,030,141 A | 2/2000 | Lieber et al. |
| 6,053,023 A | 4/2000 | Landrum |
| 6,082,923 A | 7/2000 | Maughan |
| 6,098,287 A | 8/2000 | Takahashi et al. |
| 6,139,788 A | 10/2000 | Dorr |
| 6,152,641 A | 11/2000 | Rabe |
| 6,164,829 A | 12/2000 | Wenzel et al. |
| 6,250,840 B1 | 6/2001 | Urbach et al. |
| 6,308,970 B1 | 10/2001 | Stuart |
| 6,343,889 B1 | 2/2002 | Hendricks et al. |
| 6,502,831 B2 | 1/2003 | Jarrus |
| 6,582,146 B2 | 6/2003 | Raymoure |
| 6,592,284 B1 | 7/2003 | Rechtien et al. |
| 6,615,900 B2 | 9/2003 | Takahashi |
| 6,695,521 B2 | 2/2004 | Kincaid et al. |
| 6,729,763 B2 | 5/2004 | Post et al. |
| 6,733,200 B2 | 5/2004 | Ueno |
| 6,773,197 B2 | 8/2004 | Urbach |
| 6,834,863 B2 | 12/2004 | Urbach |
| 6,840,697 B1 | 1/2005 | Dorr |
| 6,941,656 B2 | 9/2005 | Michioka et al. |
| 7,048,461 B2 | 5/2006 | Williams |
| 7,153,055 B1 | 12/2006 | Dorr |
| 7,195,398 B2 * | 3/2007 | Budde ............... F16C 11/0685 |
| | | 384/206 |
| 7,261,487 B2 | 8/2007 | Urbach |
| 7,293,787 B2 | 11/2007 | Nuñez et al. |
| 7,357,590 B2 | 4/2008 | Höppner et al. |
| 7,367,743 B2 | 5/2008 | Bernhardt et al. |
| 7,785,029 B2 | 8/2010 | Schaumann |
| 7,985,034 B2 | 7/2011 | Ruste et al. |
| 8,151,464 B2 | 4/2012 | Orend |
| 8,739,410 B2 | 6/2014 | Michioka et al. |
| 9,476,447 B2 | 10/2016 | Schmidt et al. |
| 2003/0081989 A1 | 5/2003 | Kondoh |
| 2003/0133744 A1 | 7/2003 | Urbach |
| 2003/0222412 A1 | 12/2003 | Urbach |
| 2004/0037620 A1 | 2/2004 | Bernhardt |
| 2004/0071501 A1 | 4/2004 | Ureach |
| 2004/0105721 A1 | 6/2004 | Bernhardt et al. |
| 2004/0258463 A1 | 12/2004 | Dorr |
| 2005/0053420 A1 | 3/2005 | Blaszynski |
| 2006/0029461 A1 | 2/2006 | Benick et al. |
| 2006/0088373 A1 | 4/2006 | Haight |
| 2006/0153632 A1 | 7/2006 | Bernhardt et al. |
| 2006/0182491 A1 | 8/2006 | Bernhardt et al. |
| 2006/0193681 A1 | 8/2006 | Holierhoek et al. |
| 2007/0122232 A1 | 5/2007 | Buchner et al. |
| 2007/0212164 A1 | 9/2007 | Bosse et al. |
| 2008/0056811 A1 | 3/2008 | Urbach |
| 2009/0129854 A1 | 5/2009 | Walter et al. |
| 2009/0154989 A1 | 6/2009 | Schaumann |
| 2009/0209353 A1 | 8/2009 | Abels et al. |
| 2009/0289424 A1 | 11/2009 | Fella et al. |
| 2010/0092235 A1 | 4/2010 | Schaumann |
| 2010/0119297 A1 | 5/2010 | Langendoen |
| 2011/0020056 A1 | 1/2011 | Bernhardt et al. |
| 2011/0170944 A1 | 7/2011 | Oellers |
| 2011/0293359 A1 | 12/2011 | Mahlmann et al. |
| 2012/0155952 A1 | 6/2012 | Orend |
| 2012/0170969 A1 | 7/2012 | Forthaus et al. |
| 2012/0301214 A1 | 11/2012 | Forthaus et al. |
| 2013/0121754 A1 | 5/2013 | Kuroda et al. |
| 2016/0160907 A1 | 6/2016 | Kim |
| 2016/0363162 A1 | 12/2016 | Richeson et al. |

FOREIGN PATENT DOCUMENTS

| | | |
|---|---|---|
| DE | 19923869 A1 | 12/2000 |
| DE | 10329777 A1 | 2/2005 |
| DE | 10346068 A1 | 4/2005 |
| DE | 102008033119 A1 | 3/2009 |
| DE | 102009042936 A1 | 4/2010 |
| DE | 102009043115 A1 | 5/2010 |
| DE | 102009009903 A1 | 8/2010 |
| DE | 102011018776 A1 | 1/2012 |
| DE | 102011106830 A1 | 3/2012 |
| DE | 102011107236 A1 | 5/2012 |
| EP | 0168663 A2 | 1/1986 |
| EP | 0546609 A1 | 6/1993 |
| EP | 0612925 A1 | 8/1994 |
| EP | 0860619 B1 | 8/1998 |
| EP | 0971138 A2 | 1/2000 |
| EP | 0703373 B1 | 6/2000 |
| EP | 1055076 B1 | 11/2000 |
| EP | 0971138 A3 | 12/2000 |

(56) References Cited

FOREIGN PATENT DOCUMENTS

| | | |
|---|---|---|
| EP | 0972957 A3 | 12/2000 |
| EP | 0687823 B1 | 5/2001 |
| EP | 0737820 B1 | 7/2001 |
| EP | 0778421 B1 | 7/2001 |
| EP | 0779442 B1 | 5/2002 |
| EP | 1222407 B1 | 7/2002 |
| EP | 0972957 A2 | 9/2002 |
| EP | 0836018 B1 | 3/2003 |
| EP | 01127224 B1 | 5/2003 |
| EP | 1317988 A2 | 6/2003 |
| EP | 1318317 A1 | 6/2003 |
| EP | 1323937 A1 | 7/2003 |
| EP | 1367272 A2 | 12/2003 |
| EP | 1391619 A2 | 2/2004 |
| EP | 1420178 A2 | 5/2004 |
| EP | 01422429 A2 | 5/2004 |
| EP | 1442831 A1 | 8/2004 |
| EP | 1302681 A3 | 9/2004 |
| EP | 0899471 B1 | 12/2004 |
| EP | 1329642 A3 | 6/2006 |
| EP | 1681478 A2 | 7/2006 |
| EP | 1454073 B1 | 1/2007 |
| EP | 1760337 A3 | 5/2007 |
| EP | 1233195 B1 | 8/2007 |
| EP | 1852617 A1 | 11/2007 |
| EP | 0933542 B2 | 1/2008 |
| EP | 1778988 B1 | 11/2009 |
| EP | 2122188 B1 | 10/2012 |
| JP | H05-45225 U | 6/1992 |
| JP | H04-110607 U | 9/1992 |
| JP | H11-190327 A | 7/1999 |
| JP | 2005-515366 A | 5/2005 |
| JP | 2008-057686 A | 3/2008 |
| JP | 2011169449 A | 9/2011 |
| JP | 2014-109341 A | 6/2014 |
| WO | 9624501 A1 | 8/1996 |
| WO | 9932796 A1 | 7/1999 |
| WO | 0129437 A1 | 4/2001 |
| WO | 32095248 A1 | 11/2002 |
| WO | 2003031833 A3 | 4/2003 |
| WO | 03054400 A1 | 7/2003 |
| WO | 03060337 A2 | 7/2003 |
| WO | 2005003575 A1 | 1/2005 |
| WO | 2005033530 A1 | 4/2005 |
| WO | 2005098249 A1 | 10/2005 |
| WO | 2006018218 A1 | 2/2006 |
| WO | 2006093577 A1 | 9/2006 |
| WO | 2007012396 A1 | 2/2007 |
| WO | 2007095983 A1 | 8/2007 |
| WO | 2007102416 A1 | 9/2007 |
| WO | 2007134852 A1 | 11/2007 |
| WO | 2008022621 A3 | 2/2008 |
| WO | 2010054171 A2 | 5/2010 |
| WO | 2011021217 A1 | 2/2011 |
| WO | 2011021217 A4 | 2/2011 |
| WO | 2011057758 A1 | 5/2011 |
| WO | 2011088998 A1 | 7/2011 |
| WO | 2011134604 A1 | 11/2011 |
| WO | 102011114204 A1 | 11/2012 |

OTHER PUBLICATIONS

Supplementary European Search Report for European Application No. 18847063.7 dated Apr. 7, 2021.
Chinese Office Action for Chinese Application No. 201880062534.3 dated Sep. 3, 2021.
Japanese Office Action for Japanese Application No. 2020-508329 dated Feb. 2, 2021.

* cited by examiner

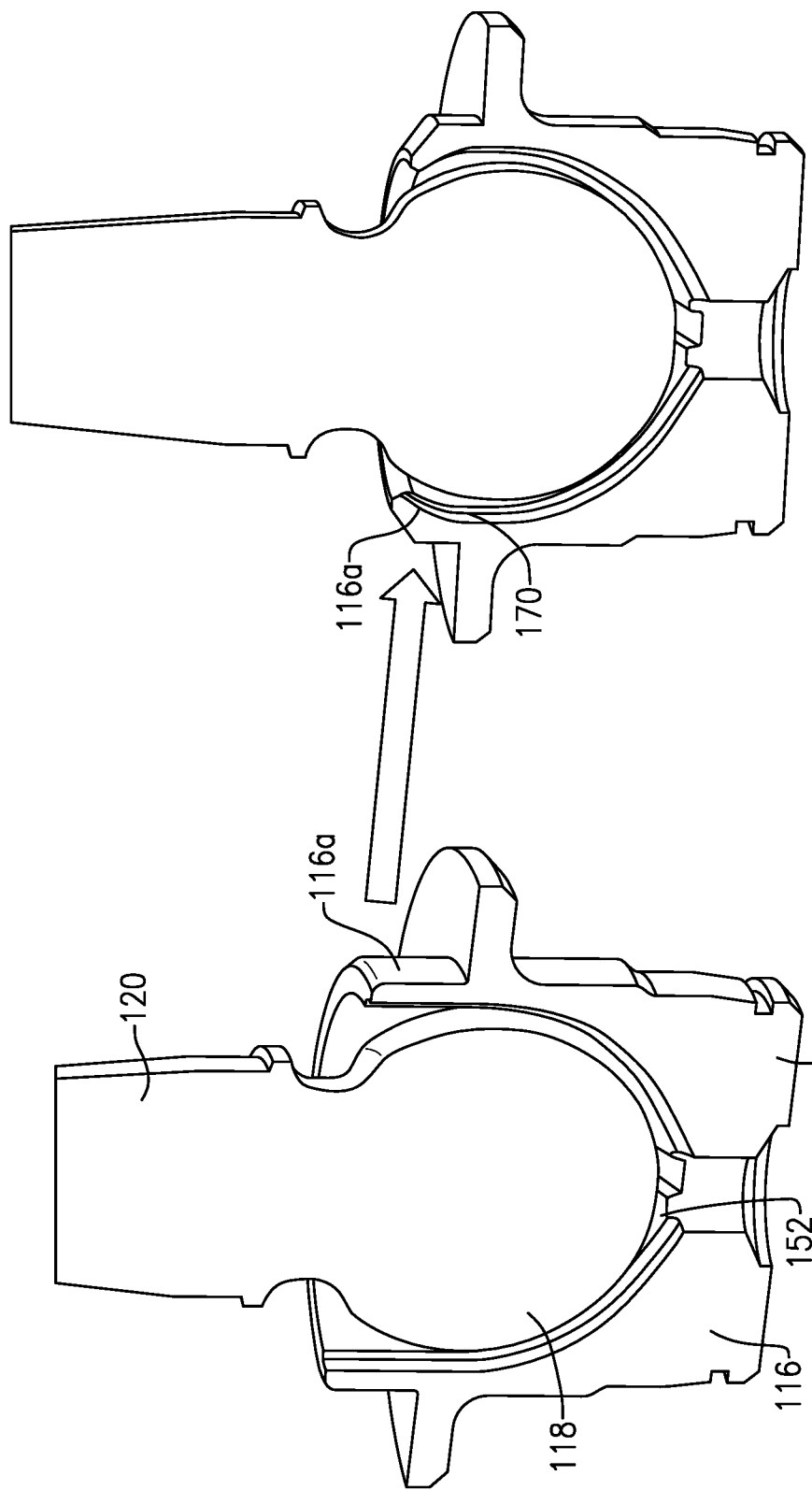

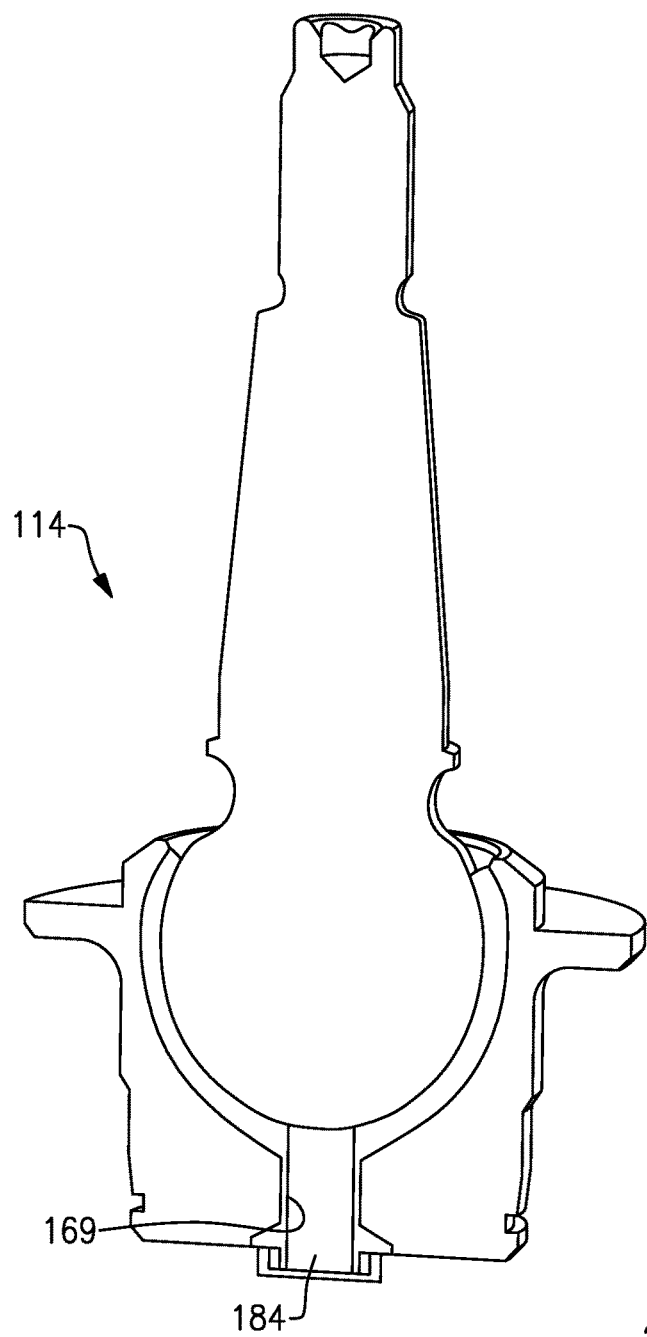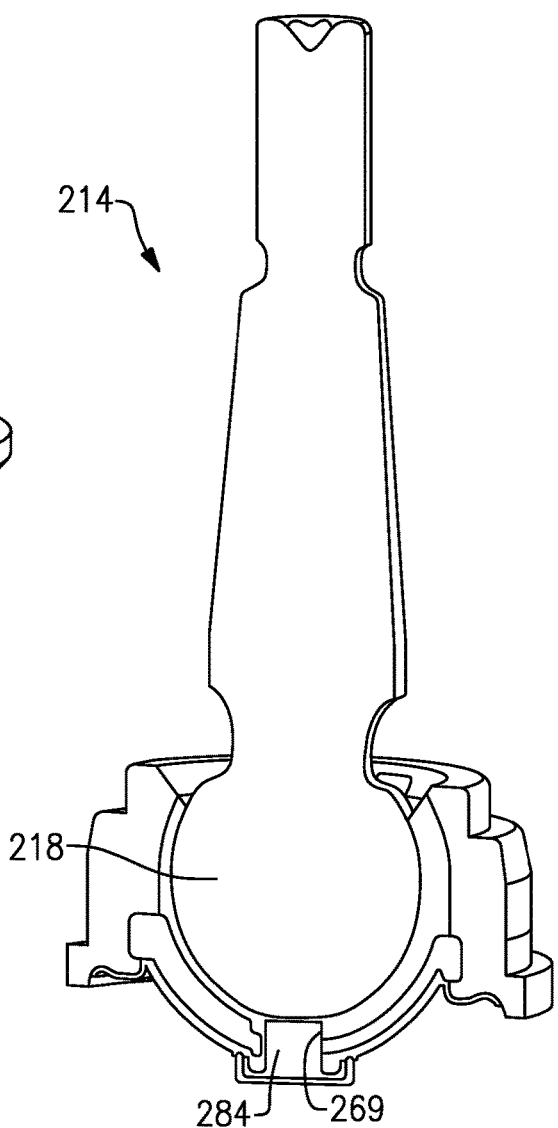
FIG.16A
FIG.16B

BALL JOINT WITH INJECTION MOLDED BEARING

CROSS-REFERENCE TO RELATED APPLICATIONS

This application is a Divisional of U.S. patent application Ser. No. 16/638,843 filed Feb. 13, 2020, which is a United States National Phase Application of PCT Application No. PCT/CA2018/050999 filed Aug. 16, 2018, which claims priority to Untied States Provisional Application No. 62/546,091, which was filed on Aug. 16, 2017, and U.S. Provisional Application No. 62/681,990, which was filed on Jun. 7, 2018.

BACKGROUND

This disclosure relates to a ball joint for a vehicle suspension or steering member, for example.

Ball joints are commonly used in vehicles for suspension or steering elements such as control arms or tie rod ends. The ball joint provides a connection that permits rotation of one element with respect to another while permitting articulation during a range of motion experienced during vehicle operation.

One example ball joint configuration provides a pre-molded plastic bearing cup to which the ball is inserted in a snap-fit relationship. The sub assembly is then inserted into a bore of a housing, and a cover is arranged over the bearing.

Providing a consistent torque between the ball and its support structure is important so as to not provide any undesired free play or too stiff of a joint. To this end, one approach over-crimps a lip of the housing onto the cover, which forces the bearing into further engagement with the housing and ball. This type of method is disclosed in U.S. Pat. No. 6,592,284 to Rechtien. Any surface imperfections in the housing are accommodated by the bearing flowing into any gaps. This assembly method is challenging in that it is difficult to provide a consistent operational torque. Another internal tolerance compensation feature is disclosed in U.S. Pat. No. 2,993,717 to Gottschald, which uses a spring to apply a load to the ball.

U.S. Pat. No. 6,941,656 to Michioka discloses a ball joint that has the outer housing cast over a resin bearing. This method eliminates any gaps between the housing and the bearing but limits the housing material to relatively low strength zinc or aluminum die cast material so as not to melt the resin bearing during the casting process. Typically high load suspension applications require the housing to be made from a high strength steel.

SUMMARY

In one exemplary embodiment, a method of manufacturing a ball joint includes arranging a ball in a bore of a housing, enclosing an end of the bore, injecting plastic into a space between the housing and the ball to form a bearing that has a bearing surface that engages the ball, shrinking the bearing to form a recess in the bearing surface, and filling the recess with a grease.

In a further embodiment of any of the above, the arranging step includes a ball that has a stud that extends from the ball. The ball and stud includes a hole therethrough. The filling step includes injecting grease through the hole and into the recess.

In a further embodiment of any of the above, the method includes the step of sealing the hole subsequent to performing the filling step.

In a further embodiment of any of the above, the enclosing step includes securing a cover over the ball. The injecting step includes the bearing surface that engages around the cover to form a cap that is integrally connected to the bearing to provide a monolithic plastic structure.

In a further embodiment of any of the above, the cover securing step includes one of welding or swaging.

In a further embodiment of any of the above, the enclosing step includes swaging the housing toward the ball.

In a further embodiment of any of the above, the plastic injecting step includes overmolding a cap over the cover and connected to the bearing to provide a monolithic plastic structure.

In a further embodiment of any of the above, the cover includes an opening. The plastic injecting step includes molding the cap and the bearing as a monolithic structure with a connector that is arranged in the opening and joins the bearing and the cap.

In a further embodiment of any of the above, the arranging step includes a ball that has a stud that extends from the ball. The ball and stud includes a hole therethrough, and includes the step of plugging the hole prior to performing the plastic injecting step.

In a further embodiment of any of the above, the cover includes an elongate cavity. The injecting step includes filling the elongate cavity with plastic. The shrinking step includes shrinking the bearing at a location opposite the elongate cavity to create the recess.

In a further embodiment of any of the above, the injecting step includes forming a bearing with a perimeter lip that is arranged about a circumference of the ball at the housing. The grease filling step includes deforming the bearing to pull the perimeter lip into the housing and provide an enhanced seal between the ball and housing.

In a further embodiment of any of the above, the grease is a first grease, and includes a step of installing a boot onto the housing with a second grease that is different than the first grease that is arranged between the boot and the ball. The perimeter lip separates the first and second greases.

In a further embodiment of any of the above, the housing includes a hole on a side opposite the stud, and the hole is in fluid communication with the recess that is formed on a side of the bearing facing the ball stud and aligned with the elongate cavity. The hole is filled with grease.

In a further embodiment of any of the above, the arranging step includes the ball that has a stud that extends from the ball. The ball and stud include a hole therethrough, and includes the step of plugging the hole prior to performing the plastic injecting step.

In a further embodiment of any of the above, the arranging step includes the ball that has a stud that extends from the ball. The ball and stud include a hole therethrough. The filling step includes injecting grease through the hole and into the recess.

In a further embodiment of any of the above, the method includes the step of sealing the hole subsequent to performing the filling step.

In a further embodiment of any of the above, the bearing has first and second sides opposite one another to provide a thickness. The first side provides the bearing surface that forms a spherical surface. The second side has a protrusion opposite the spherical surface that is received in and fills an elongate cavity in the housing. A recess is provided in the spherical surface directly opposite the protrusion relative to the thickness.

BRIEF DESCRIPTION OF THE DRAWINGS

The disclosure can be further understood by reference to the following detailed description when considered in connection with the accompanying drawings wherein:

FIGS. 11 and 12 illustrate partial cross-sectional views of the one-piece housing prior and subsequent to swaging.

FIGS. 16A and 16B are respectively cross-sectional views through the one-piece housing and two-piece housing ball joints with grease in the bearing and without the boots installed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
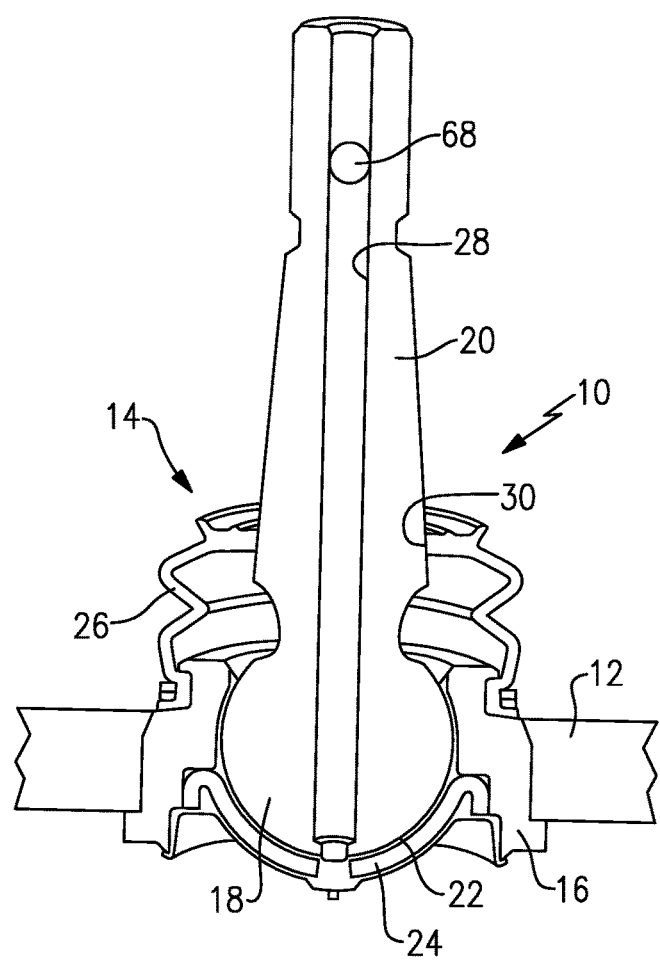
FIG. 1 is a cross-sectional view through a ball joint arranged in a suspension element to provide a suspension member.
Figure 2:
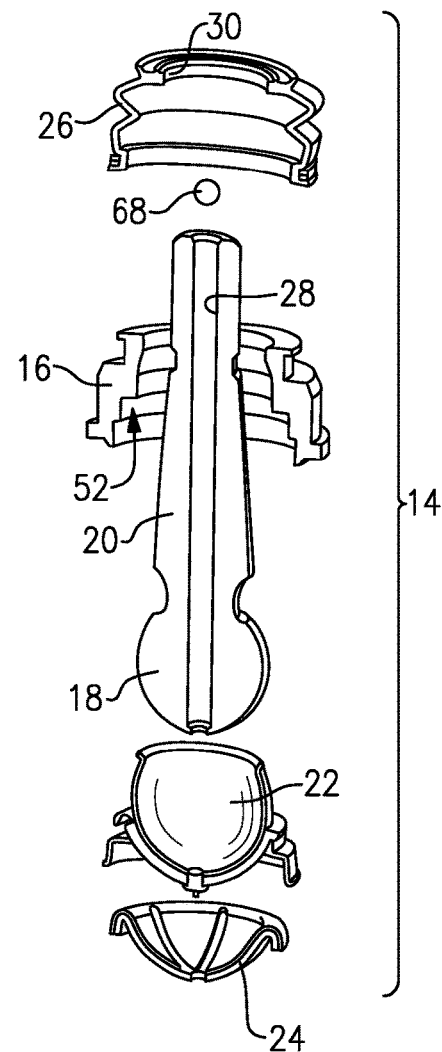
FIG. 2 is an exploded view of the ball joint shown in FIG. 1.
Figure 3A:
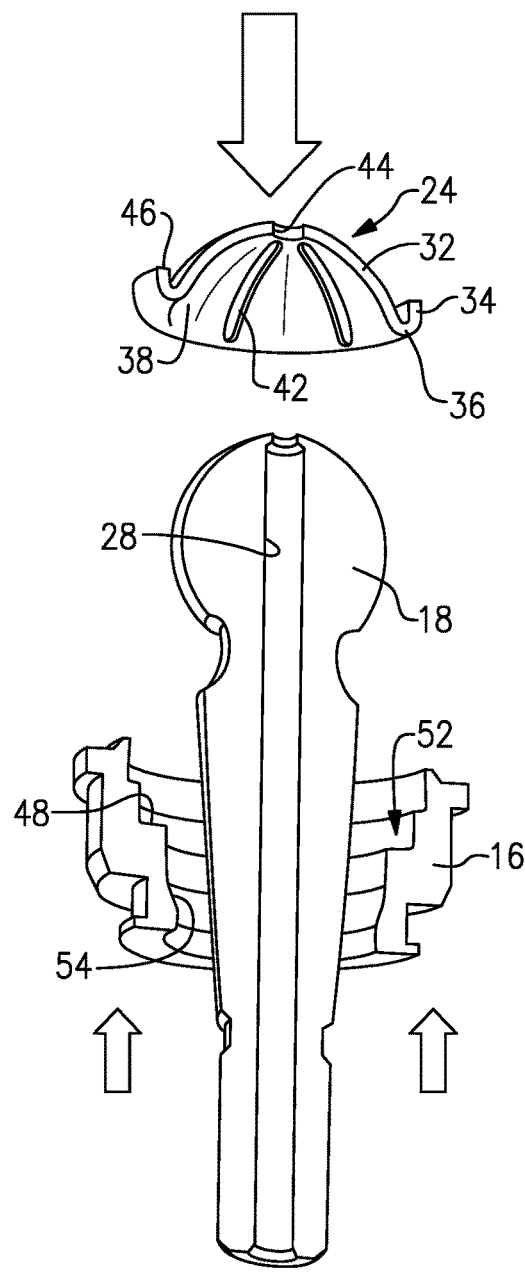
FIG. 3A illustrates a ball joint inserted into a bore of a housing.
Figure 3B:
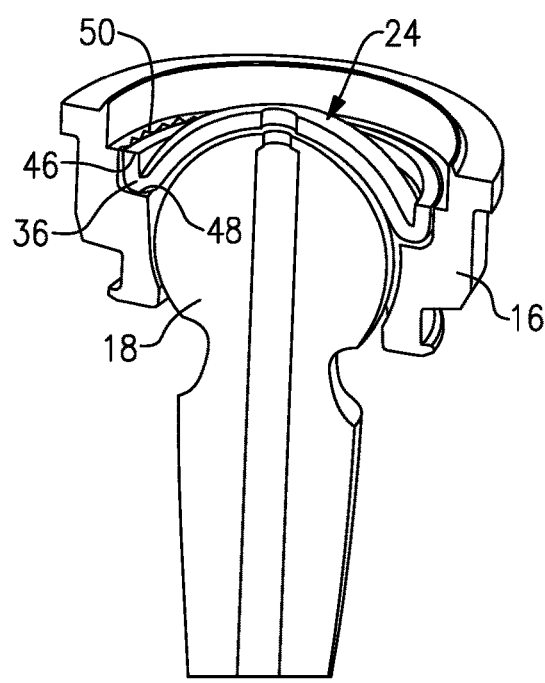
FIG. 3B illustrates a cover welded to the housing over the ball.

Referring to FIGS. 1 and 2, a ball joint 14 is provided in a suspension element 12 to provide a suspension member 10, such as a control arm or tie rod end. A ball joint 14 includes a housing 16, which may be constructed from steel. A ball 18 has a stud 20 extending therefrom, which typically includes a threaded end for securing the ball joint 14 to another suspension component, such as a steering knuckle. In the example, a single, linear hole 28 extends through the ball 18 and stud 20 and is blocked by a plug 68. The exterior surface of the ball 18 is spherical in shape to permit the ball 18 to pivot and articulate in a bore 52 of the housing 16.

In a two-piece housing configuration, a cover 24 forms another portion of the housing structure and is secured to one end of the bore 52, such as by welding, to enclose and capture the ball 18 within the housing 16. A bearing 22, constructed from a material such as acetyl, is injection-molded into the space between the ball 18 and the housing 16. A boot 26 with a seal rim 30 is provided over the stud 20 and is secured to the housing 16 opposite the cover 24 to seal the ball 18 from the elements and prevent corrosion.

Referring to FIGS. 3A-5, the ball joint 14 is manufactured by arranging the ball 18 in the bore 52. The bore 52 is provided by a tapered wall 54, which captures the ball 18 at an end of the housing 16 opposite the cover 24. The cover 24 includes a domed portion 32 having a perimeter flange 34 providing a ridge 36. The ridge 36 abuts a ledge 48 at a perimeter of the bore 52. An edge 46 of the flange 34 is welded to the housing 16, for example, by laser welding, to provide a weld 50 securing the cover 24 to the housing 16.

One side of the domed portion 32 provides a spherical surface 38 having circumferentially spaced apart grooves 42 adjoining and radiating outwardly from an opening 44 in the cover 24. The grooves 42 may be formed by coining, for example.

Figure 4:
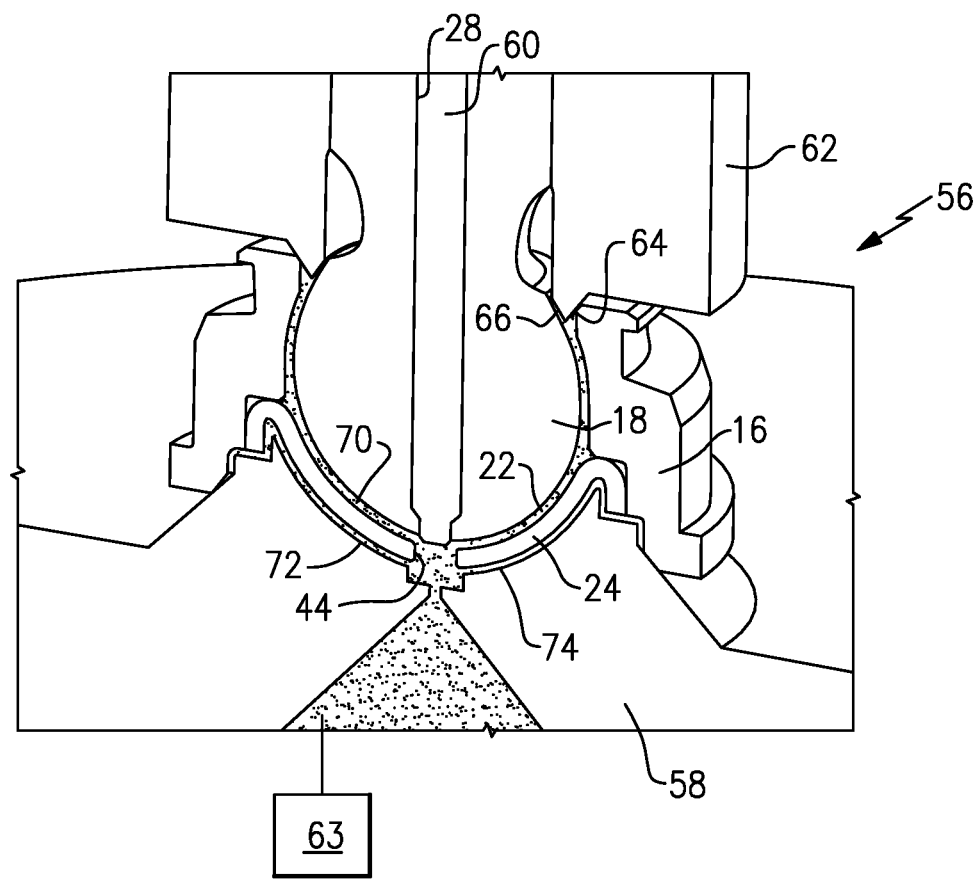
FIG. 4 schematically depicts an injection molding process that forms the bearing and a cap arranged over the cover.
Figure 5:
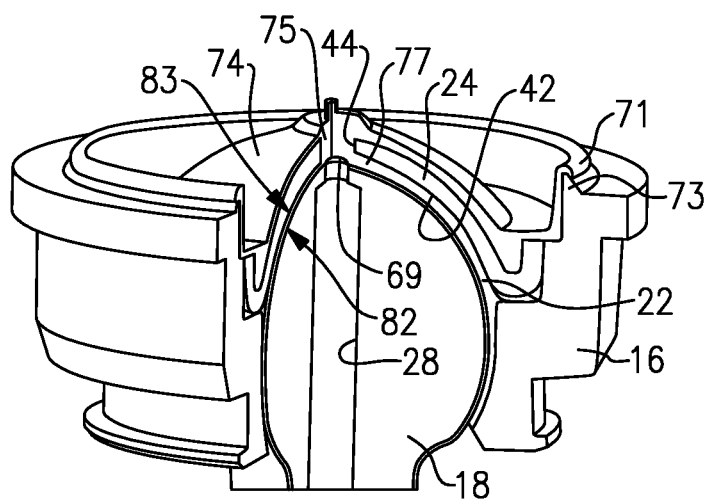
FIG. 5 is a partial cross-sectional view through a portion of the ball joint.
Figure 6:
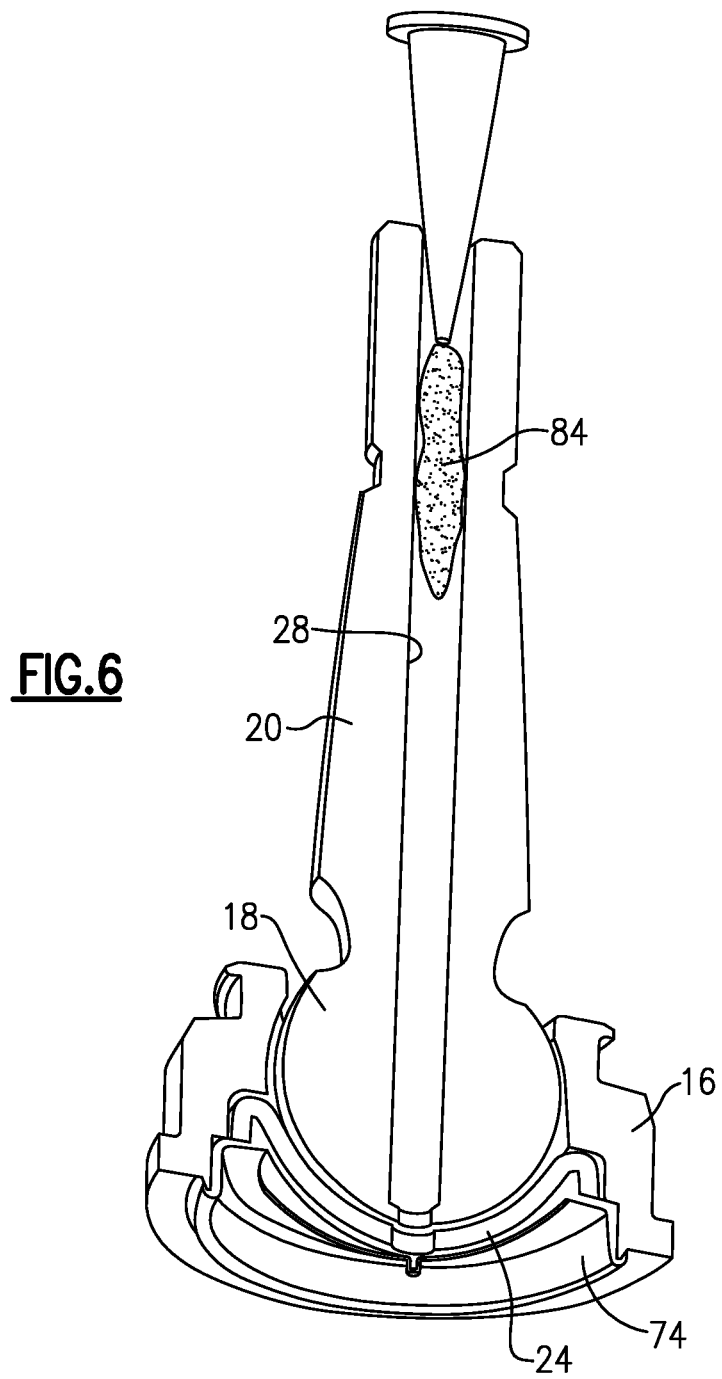
FIG. 6 illustrates grease injected into the ball joint.

A plastic injection molding process is shown in FIG. 4. Molding equipment 56 is used to inject a molten plastic, such as acetyl, into the space between the housing 16, the cover 24 and the ball 18 to provide the bearing 22.

Multiple mold portions engage various components of the ball joint 14 to maintain a space provided by first and second cavities 70, 72 on opposite sides of the cover 24 and that are in fluid communication with one another. In one example, a first mold portion 58 abuts the housing 16 to create a second cavity 72 between the first mold portion 58 and a bottom portion of the housing 16 and the cover 24. A second mold portion 60, such as a pin, is inserted into the hole 28 to plug and block any molten plastic from entering the hole 28. A third mold portion 62 includes first and second chamfers 64, 66 that respectively abut the housing 16 and the ball 18 to prevent molten plastic from escaping the first cavity 70 during molding.

A plastic injector 63 injects molten plastic through an outlet in the first mold portion 58 into the second cavity 72, through the opening 44 in the cover 24 and into the first cavity 70.

The opening 44 is aligned with the hole 28. During injection, plastic flows through the opening 44 forming protrusions 77 that fill the grooves 42 in the cover 24 on a side facing the ball 18. A spherical surface is formed on a first side 82 of the bearing 22 that engages the corresponding spherical surface of the ball 18. A depression 69 is provided in the bearing surface at the first side 82 of the bearing 22 and is formed by an end of the second mold portion 60, such that the depression 69 is beneath the hole 28 and aligned with the opening 44.

An end of the housing 16 includes an annular projection 73 circumscribing the bore 52. A cap 74 is over-molded over the cover 24, the weld 50 and a portion of the annular projection 73 (with extension 71) to provide a water-tight seal and prevent corrosive elements from entering the ball joint 14. A monolithic plastic structure is thus formed including the bearing 22 joined to the cap 74 by a connector 75.

Figure 7A:
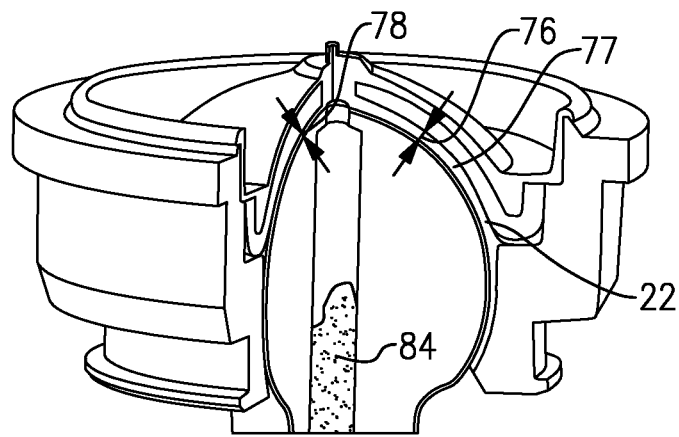
FIG. 7A illustrates a bearing surface and a recess provided therein to accommodate the grease.
Figure 7B:
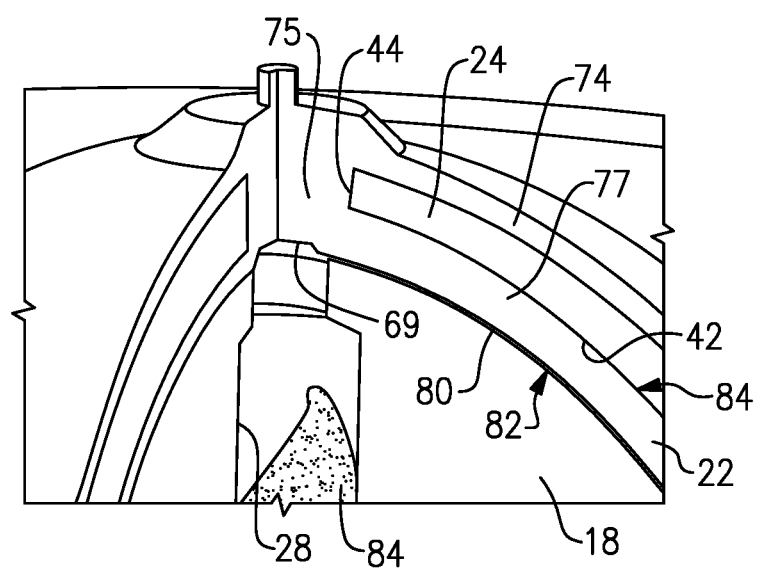
FIG. 7B is an enlarged view of the portion of the ball joint shown in FIG. 7A.

As the plastic cools, it shrinks slightly, approximately 2%. The wall thickness of the bearing 22 varies due to the presence of the grooves 42 in the cover. Thus, a first thickness 76 of the bearing 22 in the area of the grooves 42 is larger than that of a second thickness 78 provided by the adjacent bearing structure, as shown in FIG. 7A. As a result of the plastic shrinking, a recess 80 will form next to the ball 18 in the spherical bearing surface on the first side 82 at a location opposite each groove 42, as best shown in FIG. 7B.

As shown in FIGS. 6-7B and 9, grease 84 is injected through the hole 28 into the depression 69 left by the second mold portion 60, permitting the grease 84 to travel into the recesses 80 that adjoin the depression 69. A plug 68 is inserted into the hole 28 to retain the grease 84 and prevent entry of debris.

Figure 8A:
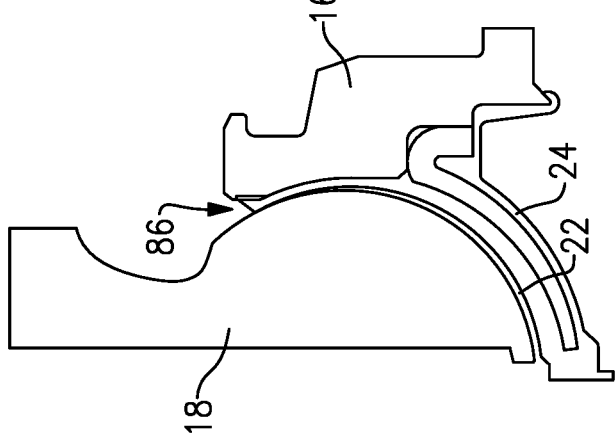
FIGS. 8A and 8B are partial cross-sectional views of a portion of the bearing arranged between the ball and the housing as molded.
Figure 8B:
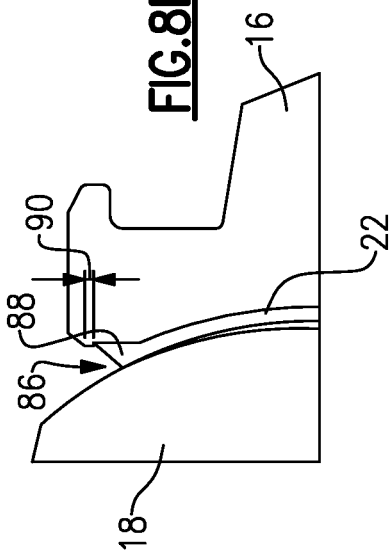
Figure 8C:
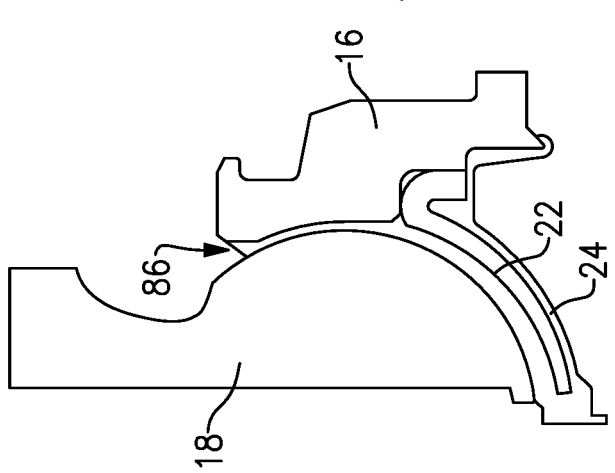
FIGS. 8C and 8D illustrate the deflection of the bearing in an exaggerated fashion subsequent to grease being injected into the ball joint.
Figure 8D:
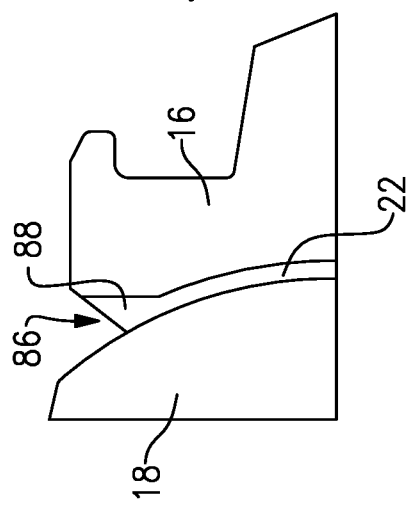
Figure 9:
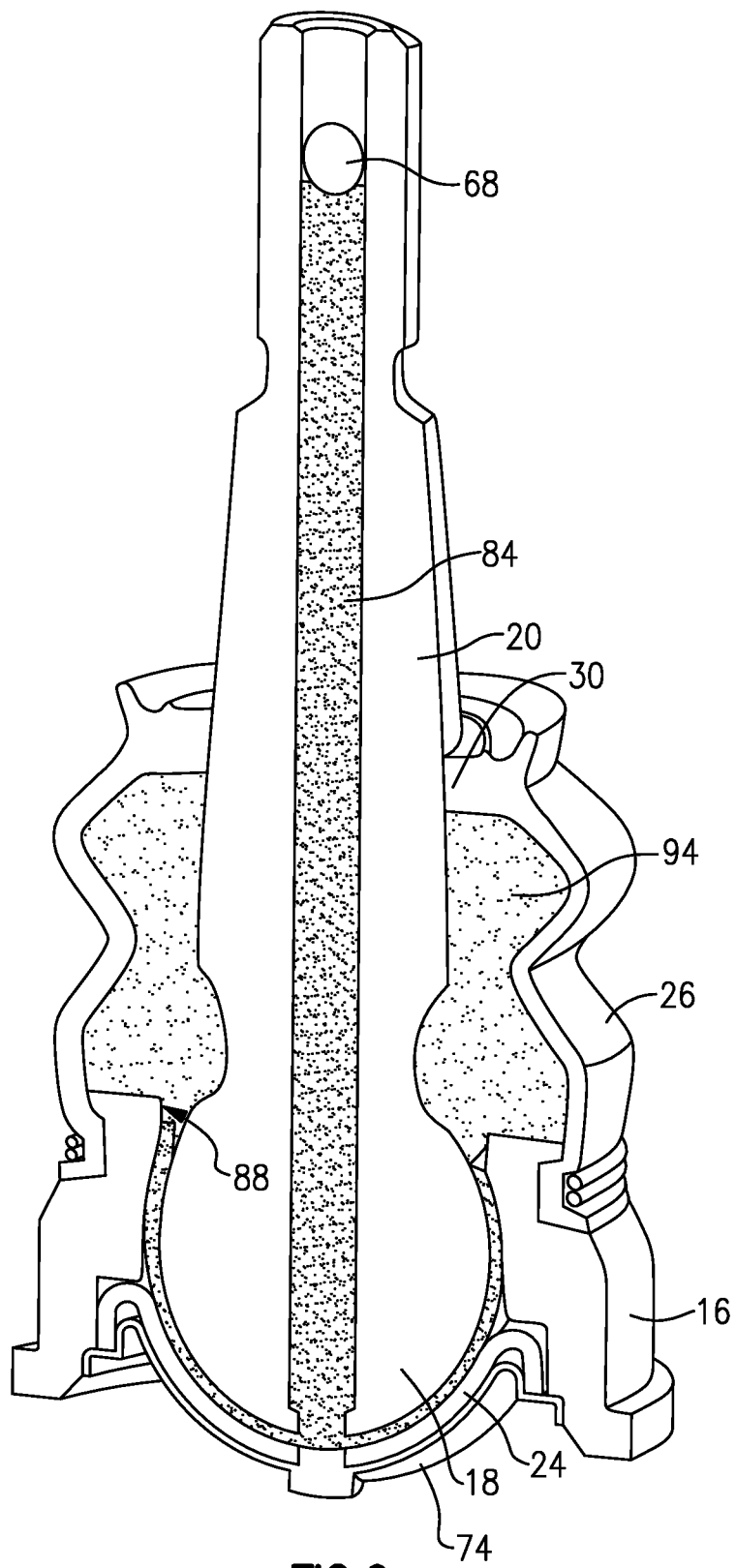
FIG. 9 is a cross-sectional view through the ball joint illustrating the first and second greases.

As shown in FIGS. 8A-8B, a slight perimeter lip 88 is provided at the end 86 of the bearing 22. As grease 84 fills the depressions, the bearing 22 deforms, pulling the lip 88 a distance 90 into the space between the ball 18 and the housing 16 (exaggerated in FIGS. 8C-8D) creating an interference fit and an enhanced seal between the ball 18 and the housing 16. A second grease 94, which is different than the first grease 84, is provided between the boot 26 and the ball 18. The lip 88 separates the first and second greases 84, 94, as shown schematically in FIG. 9.

Figure 10A:
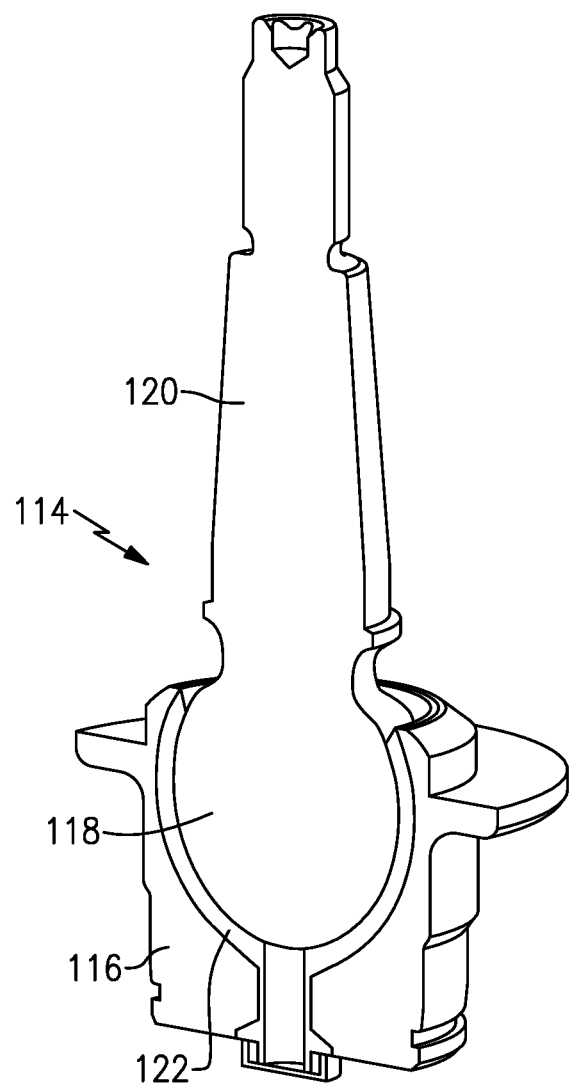
FIGS. 10A and 10B are cross-sectional views respectively of one-piece housing and two-piece housing alternative ball joint embodiments.
Figure 10B:
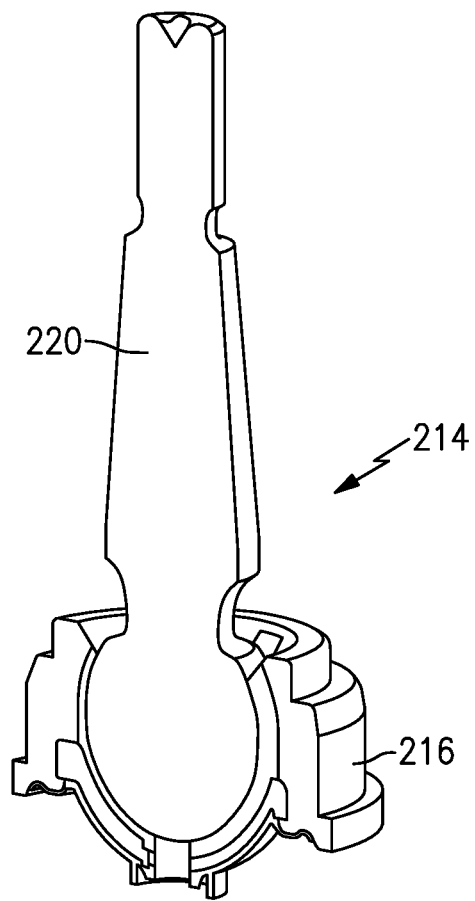

Variations of the ball joint 14 described above may also be used. Like numerals (e.g., 14, 114, 214 for "ball joints") are used to describe similar elements between the various embodiments. A one-piece housing ball joint 114 is shown in FIG. 10A, and another two-piece housing ball joint 214 is shown in FIG. 10B. The one-piece housing ball joint 114 uses thicker walls, which may be more suitable in particular for higher axial loads. Grease is injected through the housing 116, 216 rather than the stud 120, 220 in both example ball joints 114, 214.

Referring to FIGS. 10A, 11 and 12, the ball joint 114 has a housing 116 that includes an annular wall 116a on a side by the stud 120 and opposite a base 116b of the housing 116. After the ball 118 has been placed into the bore 152 and prior to injecting the bearing 122, the annular wall 116a is deformed inward toward the ball 118, e.g., swaged, to enclose the ball 118 within the bore, as shown in FIG. 12. However, the annular wall 116a remains spaced from the ball 118 to provide the first cavity 170 that receives the bearing 122 during molding.

As described in connection with the ball joint 14 shown in FIG. 7B, the plastic bearing 22 shrinks as it cools, which forms the recesses 80 next to the ball 18 in the spherical bearing surface on the first side 82 at a location opposite each groove 42. It may be desirable to provide the grease farther up toward the stud for improved lubrication. To this end, as shown in FIGS. 13A-14B, the housings 116, 216 each have grooves 142, 242 that extend to an end 117, 217 of the housing 116, 216 to provide corresponding recesses 180, 280. However, it should be understood that the grooves 142, 242 need not extend all the way through to the terminal end of the housings 116, 216 as shown in the example embodiments. For the two-piece housing 216, a portion of the groove 242 is provided in the cover 224, which is preferably circumferentially aligned with the grooves in the other housing portion. Even if the grooves 242 are not circumferentially aligned with the grooves in the other housing portion (FIG. 13C), grease will still flow into the recess 283 (FIG. 14B) formed from the bearing 222 shrinking at a junction 281 between the cover 224 and the other housing portion.

Figure 13A:
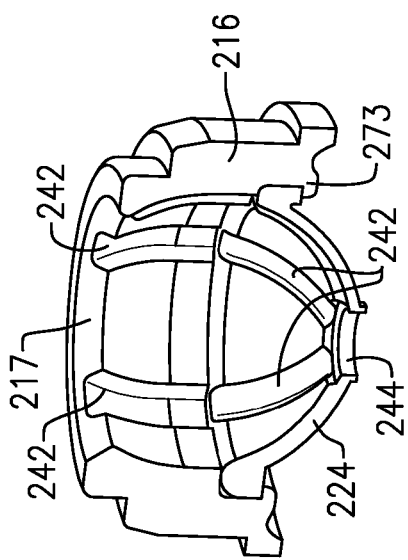
FIGS. 13A and 13B depict grooves in the one-piece and two-piece housings.
Figure 13B:
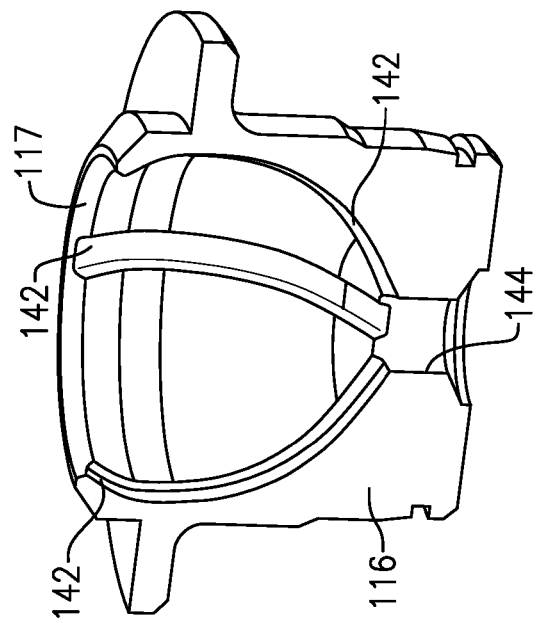
Figure 13C:
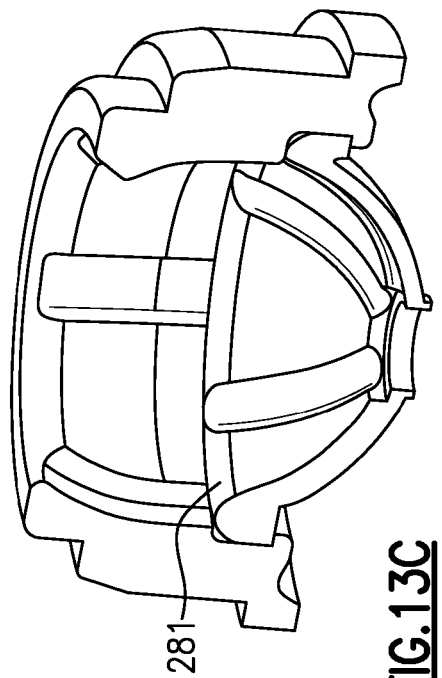
FIG. 13C illustrates grooves in the two-piece housing misaligned.

As shown in FIG. 13B, the annular projection 273 may be folded over, or swaged, onto the cover 224 as an alternative to welding thereby reducing the likelihood of corrosion.

Figure 15:
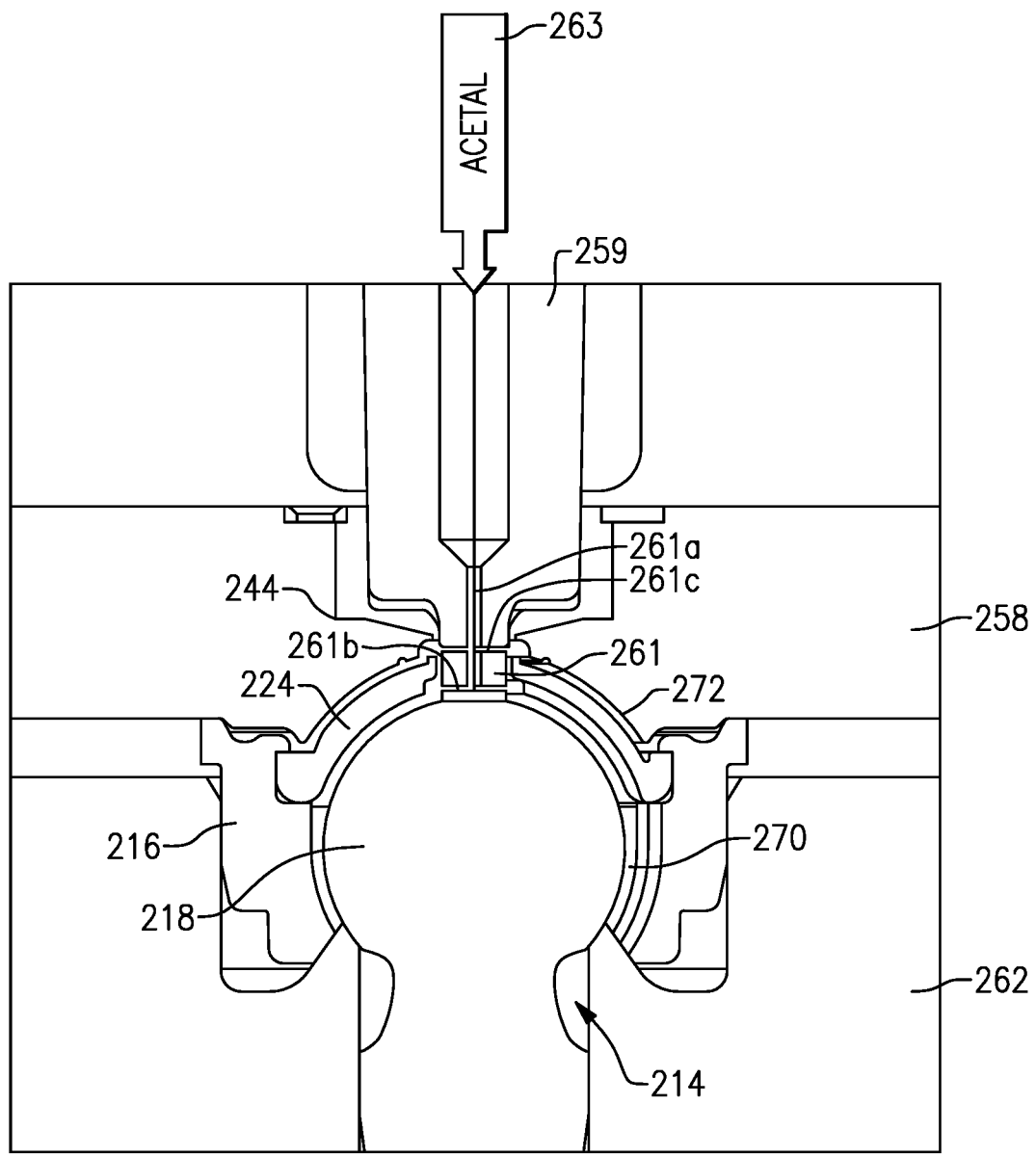
FIG. 15 schematically depicts the injection molding process wherein a plastic is injected from a side of the housing adjacent the ball.

The bearing 122, 222 of each of the ball joints 114, 214 is injected through the base of the housing 116, 216 opposite the stud 120, 220. The plastic injection molding process for the ball joint 214 is shown in FIG. 15. First and third mold portions 258, 262 are arranged about the ball joint 214 in a manner similar to that described in connection with FIG. 4. A second mold portion 259 includes an end 261 that is inserted into the opening 244 in the cover 224 and into abutment with the ball 218. A fluid passage 261a that is connected to a plastic injector 263 is in communication with radially extending first and second passageways 261b, 261c.

Figure 18:
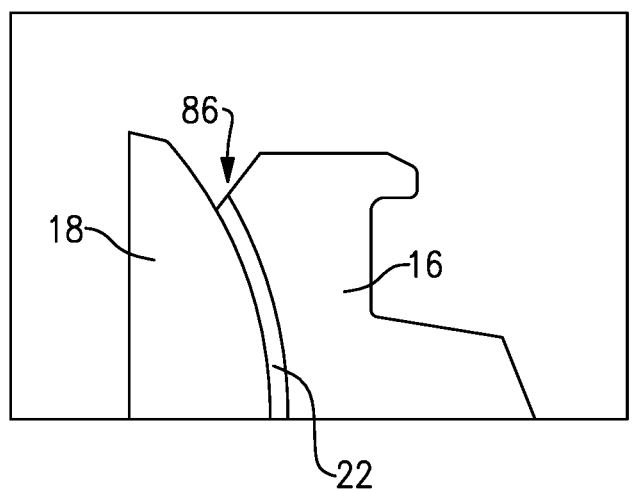
FIG. 18 illustrates a bearing without a lip.

A first cavity 270 is provided between the ball 218 and the cover 224, and a second cavity 272 is provided between the cover 224 and the first mold portion. The first and second passageways 261b and 261c are aligned respectively with the first and second cavities 270, 272, which correspondingly provide the bearing 222 and the cap 274. The lip 88 described in FIGS. 8A-8D may be omitted, as shown in FIG. 18.

Figures 14A, 14B:
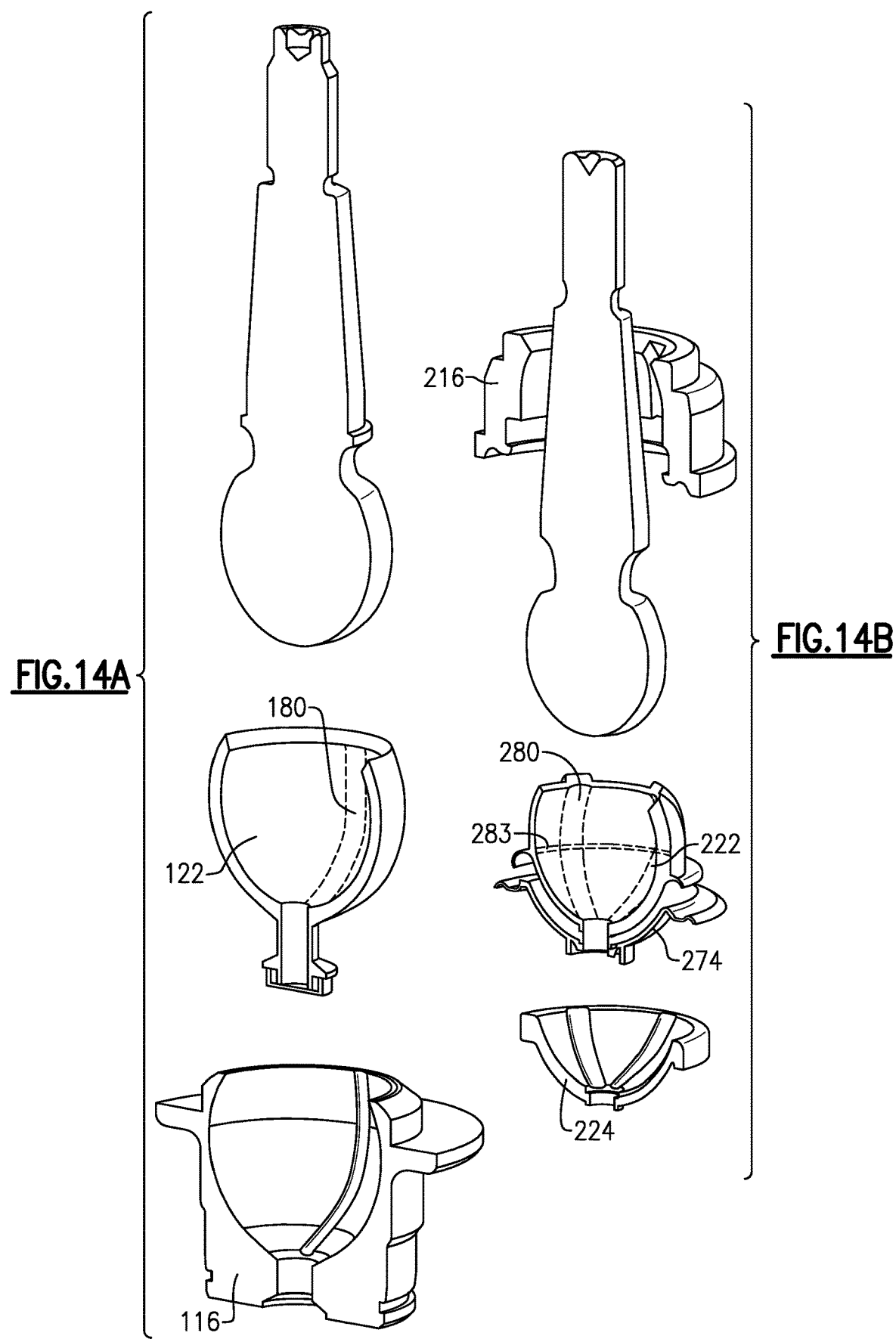
FIGS. 14A and 14B are respectively cross-sectional exploded views of portions of the one-piece housing and two-piece housing ball joints.
Figure 17:
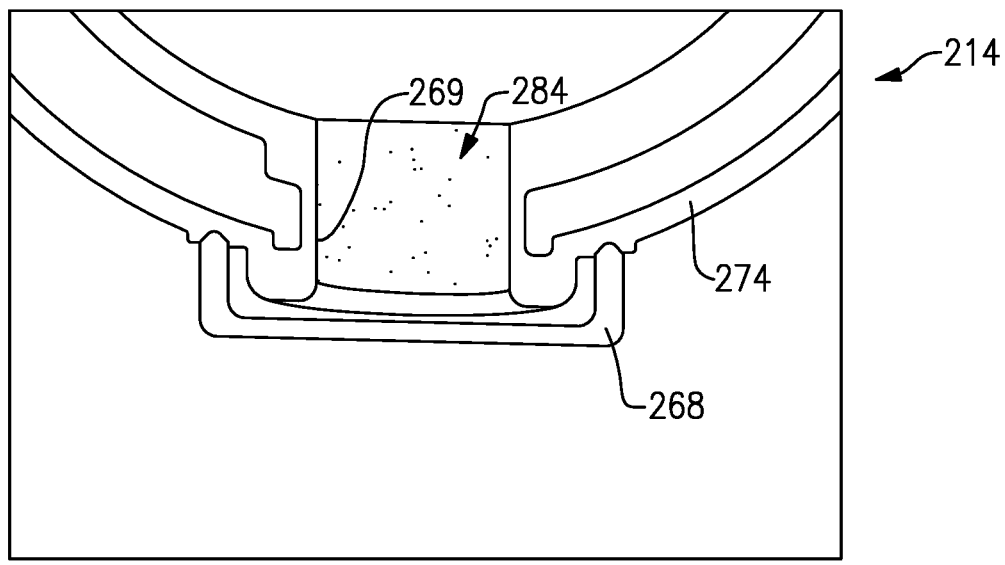
FIG. 17 illustrates a plug installed over the hole used to supply the bearing with grease.

The ball joints 114, 214 are shown in FIGS. 16A and 16B subsequent to molding the bearings 122, 222. The second mold portion 259 is withdrawn from the ball joint 214 subsequent to molding, leaving a hole 269 that adjoins the recesses 280 (FIG. 14B). Grease 284 is injected through the hole 269 and into the recesses 280 where it lubricates the ball 218. The injected grease 284 causes the bearing 222 to balloon slightly and achieve the desired lubrication of and load characteristic on the ball 218. The hole 169 (FIG. 16A), 269 (FIG. 16B) acts as a reservoir for the grease 184, 284. Referring to FIG. 17, a plug 268 is installed onto the cap 274 to cover the hole 269 and retain the grease 284 within the ball joint 114. The plug 268 may be snapped and/or ultrasonically welded onto the cap 274.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:
1. A method of manufacturing a ball joint comprising:
arranging a ball in a bore of a housing;
enclosing an end of the bore including securing a cover over the ball;
injecting plastic into a space between the housing and the ball to form a bearing having a bearing surface engag- ing the ball and the cover to form a cap integrally connected to the bearing to provide a monolithic plastic structure;

shrinking the bearing to form a recess in the bearing surface; and filling the recess with a grease.

2. The method of claim 1, wherein the arranging step includes a ball having a stud extending from the ball, the ball and stud includes a hole therethrough, and the filling step includes injecting grease through the hole and into the recess.

3. The method of claim 1, comprising the step of sealing the hole subsequent to performing the filling step.

4. The method of claim 1, wherein the cover securing step includes one of welding or swaging.

5. The method of claim 1, wherein the enclosing step includes swaging the housing toward the ball.

6. The method of claim 4, wherein the plastic injecting step includes overmolding the cap over the cover.

7. The method of claim 6, wherein the cover includes an opening, and the plastic injecting step includes molding the cap and the bearing as the monolithic structure with a connector arranged in the opening and joining the bearing and the cap.

8. The method of claim 1, wherein the cover includes an elongate cavity, and the injecting step includes filling the elongate cavity with plastic, and the shrinking step includes shrinking the bearing at a location opposite the elongate cavity to create the recess.

9. The method of claim 1, wherein the injecting step includes forming a bearing with a perimeter lip arranged about a circumference of the ball at the housing, and the grease filling step includes deforming the bearing to pull the perimeter lip into the housing and provide an enhanced seal between the ball and housing.

10. The method of claim 1, wherein the grease is a first grease, and comprising a step of installing a boot onto the housing with a second grease that is different than the first grease arranged between the boot and the ball, the perimeter lip separating the first and second greases.

11. The method of claim 1, wherein the housing includes a hole on a side opposite the stud, and the hole is in fluid communication with the recess formed on a side of the bearing facing the ball stud and aligned with the elongate cavity, wherein the hole is filled with grease.

12. The method of claim 1, wherein the arranging step includes the ball having a stud extending from the ball, the ball and the stud including a hole therethrough, and comprising the step of plugging the hole prior to performing the plastic injecting step.

13. The method of claim 1, wherein the arranging step includes the ball having a stud extending from the ball, the ball and stud including a hole therethrough, and the filling step including injecting grease through the hole and into the recess.

14. The method of claim 13, comprising the step of sealing the hole subsequent to performing the filling step.

15. The method of claim 1, wherein the bearing has first and second sides opposite one another to provide a thickness, the first side provides the bearing surface forming a spherical surface, and the second side having a protrusion opposite the spherical surface that is received in and fills an elongate cavity in the housing, a recess is provided in the spherical surface directly opposite the protrusion relative to the thickness.

* * * * *